United States Patent
Sakashita et al.

(10) Patent No.: US 10,694,049 B2
(45) Date of Patent: Jun. 23, 2020

(54) MANAGEMENT SYSTEM SPECIFYING A SUPPORT CANDIDATE AMONG PERSONS CAPABLE OF HANDLING ERRORS OCCURRING IN ELECTRONIC DEVICES

(71) Applicant: KYOCERA Document Solutions Inc., Osaka (JP)

(72) Inventors: Fumiya Sakashita, Osaka (JP); Yoichi Hiranuma, Osaka (JP); Shoichi Sakaguchi, Osaka (JP); Shohei Fujiwara, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/275,885

(22) Filed: Feb. 14, 2019

(65) Prior Publication Data

US 2019/0268483 A1   Aug. 29, 2019

(30) Foreign Application Priority Data

Feb. 23, 2018   (JP) .................................. 2018-031297

(51) Int. Cl.
| | |
|---|---|
| H04N 1/00 | (2006.01) |
| H04N 7/18 | (2006.01) |
| G06K 9/00 | (2006.01) |

(52) U.S. Cl.
CPC ..... *H04N 1/00079* (2013.01); *G06K 9/00255* (2013.01); *G06K 9/00288* (2013.01);
(Continued)

(58) Field of Classification Search
None
See application file for complete search history.

(56) References Cited

U.S. PATENT DOCUMENTS

| | | | | |
|---|---|---|---|---|
| 8,456,663 | B2* | 6/2013 | Kotake | ............... G06F 11/0733 |
| | | | | 358/1.13 |
| 8,472,666 | B2* | 6/2013 | Takehiko | ........... G06K 9/00228 |
| | | | | 340/540 |

(Continued)

FOREIGN PATENT DOCUMENTS

JP    2005-236346 A    9/2005

OTHER PUBLICATIONS

Machine translation of Japanese Pat. Appl. No. 2003-244683 to Yanaghiara, published Aug. 2003.*
(Continued)

*Primary Examiner* — Paul F Payer
(74) *Attorney, Agent, or Firm* — IP Business Solutions, LLC

(57) ABSTRACT

A management system includes an electronic device, a plurality of image pickup devices, a storage unit, and a server. A first control unit in the server detects an image portion indicating a face of a person in a captured image, collates the detected image portion to face images stored in the storage unit, and specifies, as a person inside a building, a person whose face image is identical to the image portion. When an error is detected in the electronic device, a second control unit in the electronic device specifies, among persons specified by the first control unit, a person whom error handling capability information stored in the storage section indicated as capable of handling the error, obtains, among the captured images captured by the plurality of the image pickup devices, a captured image showing the specified person, and allows a display to display the obtained captured image.

10 Claims, 8 Drawing Sheets

(52) U.S. Cl.
CPC ..... *H04N 1/00037* (2013.01); *H04N 1/00251* (2013.01); *H04N 1/00405* (2013.01); *H04N 7/181* (2013.01); *H04N 2201/0094* (2013.01)

(56) References Cited

U.S. PATENT DOCUMENTS

| | | | | |
|---|---|---|---|---|
| 9,256,072 | B2* | 2/2016 | Lyren | G06F 1/163 |
| 10,108,851 | B2* | 10/2018 | Bandameedipalli | G06K 9/6807 |
| 2007/0024921 | A1* | 2/2007 | Ohta | H04N 1/00249 358/448 |
| 2011/0087535 | A1* | 4/2011 | Yoshizawa | G06Q 20/20 705/14.26 |

OTHER PUBLICATIONS

Machine translation of Japanese Pat. Appl. No. 2005-236346 to Kimura, published Sep. 2005.*

* cited by examiner

Fig.6
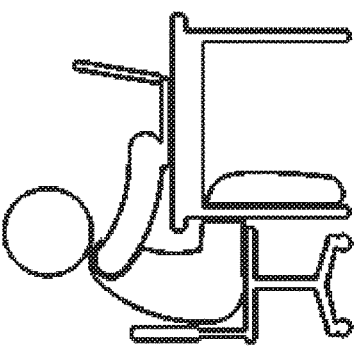
SUPPORT CANDIDATE: MR. A
CONTACT DETAILS: asan@kyacee.com
LOCATION: ACCOUNTING DEPARTMENT
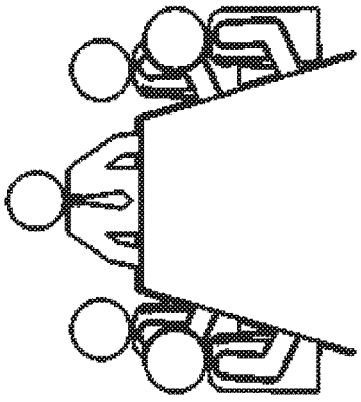
SUPPORT CANDIDATE: MS. B
CONTACT DETAILS: bsan@kyacee.com
LOCATION: CONFERENCE ROOM
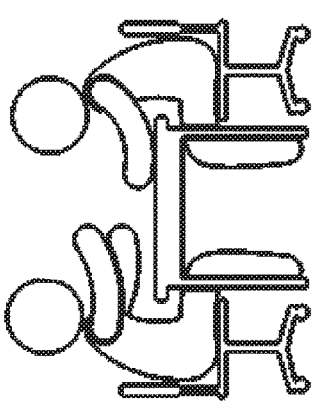
SUPPORT CANDIDATE: MR. C
CONTACT DETAILS: csan@kyacee.com
LOCATION: STOREROOM
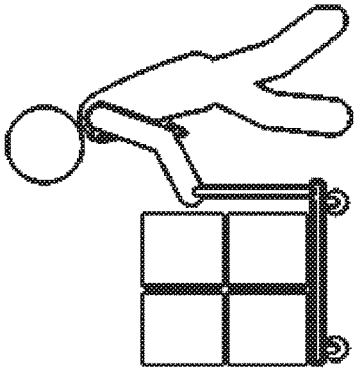
SUPPORT CANDIDATE: MS. D
CONTACT DETAILS: dsan@kyacee.com
LOCATION: MEETING ROOM
137

MANAGEMENT SYSTEM SPECIFYING A SUPPORT CANDIDATE AMONG PERSONS CAPABLE OF HANDLING ERRORS OCCURRING IN ELECTRONIC DEVICES

INCORPORATION BY REFERENCE

This application claims priority to Japanese Patent Application No. 2018-031297 filed on 23 Feb. 2018, the entire contents of which are incorporated by reference herein.

BACKGROUND

The present disclosure relates to a management system and particularly relates to a technique for, upon occurrence of an error in an image forming apparatus, promptly finding a person capable of handling the error.

Image forming apparatuses such as a copier and printer in some cases are connected to a network and used by several users. Many users are to be affected if such the shared image forming apparatus goes down for a long time. Upon occurrence of an error, therefore, the image forming apparatus must be promptly recovered. To cope with the situation, there is a known image processing apparatus that is for example connected via a network to a plurality of output terminals and has a function of managing the error occurring during processing of printing and facsimile transmission/reception. Such the image processing apparatus includes: an error detecting section that detects an error occurring during processing of printing and facsimile transmission/reception; an error notification time setting section that sets an error notification time at which the error occurring in the image processing apparatus is notified to each of the plurality of output terminals; and an error notification section that notifies of the error to the plurality of output terminals at the error notification time having been set by the error notification time setting section.

SUMMARY

A technique improved over the aforementioned technique is proposed as one aspect of the present disclosure.

A management system according to one aspect of the present disclosure includes an electronic device, a plurality of image pickup devices, a storage unit, and a server. The electronic device is installed inside a building. The plurality of image pickup devices is installed inside the building or at predetermined positions around the building. The storage unit stores user information for each user: the user information includes a face image showing a face of each person, contact details, and error handling capability information indicating whether it is a person capable of handling an error of the electronic device. The server includes a first control unit. The first control unit contains a processor and, upon execution of a first control program by the processor, functions as: a face detecting section that analyzes a captured image captured by each of the plurality of image pickup devices and detects an image portion indicating a face of a person shown in the captured image; and a person specifying section that collates the image portion detected by the face detecting section to the face image stored in the storage unit, and specifies, as a person who is present in the building, a person whose face image is identical to the image portion and is stored as the user information. The electronic device includes a display and a second control unit. The second control unit contains a processor and, upon execution of a second control program by the processor, functions as: an error detecting section that detects an error occurred in the electronic device; a candidate specifying section that refers to the user information stored in the storage unit when the error detecting section detects the error, and specifies as a support candidate, among persons that person specifying section has specified, a person who is indicated by the error handling capability information as being capable of handling the error; a captured image obtaining section that obtains, among captured images captured by the plurality of image pickup devices, a captured image in which the support candidate specified by the candidate specifying section is shown; and a controller that allows the display to display the captured image captured by the captured image obtaining section.

A management system according to another aspect of the present disclosure includes an electronic device and a plurality of image pickup devices. The electronic device is installed inside a building. The plurality of image pickup devices is installed inside the building or at predetermined positions around the building. The electronic device includes a display, a storage unit, and a control unit. The storage unit stores user information for each user: the user information includes a face image showing a face of each person, contact details, and error handling capability information indicating whether it is a person capable of handling an error of the electronic device. The control unit contains a processor and, upon execution of a first control program and a second control program by the processor, functions as: a face detecting section that analyzes a captured image captured by each of the plurality of image pickup devices and detects an image portion indicating a face of a person shown in the captured image; a person specifying section that collates the image portion detected by the face detecting section to the face image stored in the storage unit, and specifies, as a person who is present in the building, a person whose face image is identical to the image portion and is stored as the user information; an error detecting section that detects an error occurred in the electronic device; a candidate specifying section that refers to the user information stored in the storage unit when the error detecting section detects the error, and specifies as a support candidate, among persons that person specifying section has specified, a person who is indicated by the error handling capability information as being capable of handling the error; a captured image obtaining section that obtains, among captured images captured by the plurality of image pickup devices, a captured image in which the support candidate specified by the candidate specifying section is shown; and a controller that allows the display to display the captured image captured by the captured image obtaining section.

BRIEF DESCRIPTION OF THE DRAWINGS

FIG. 6 is a diagram showing another example of the display screen displayed at the display.

DETAILED DESCRIPTION

Hereinafter, a description will be given of a management system according to a first embodiment of the present disclosure with reference to the drawings.

Figure 1:
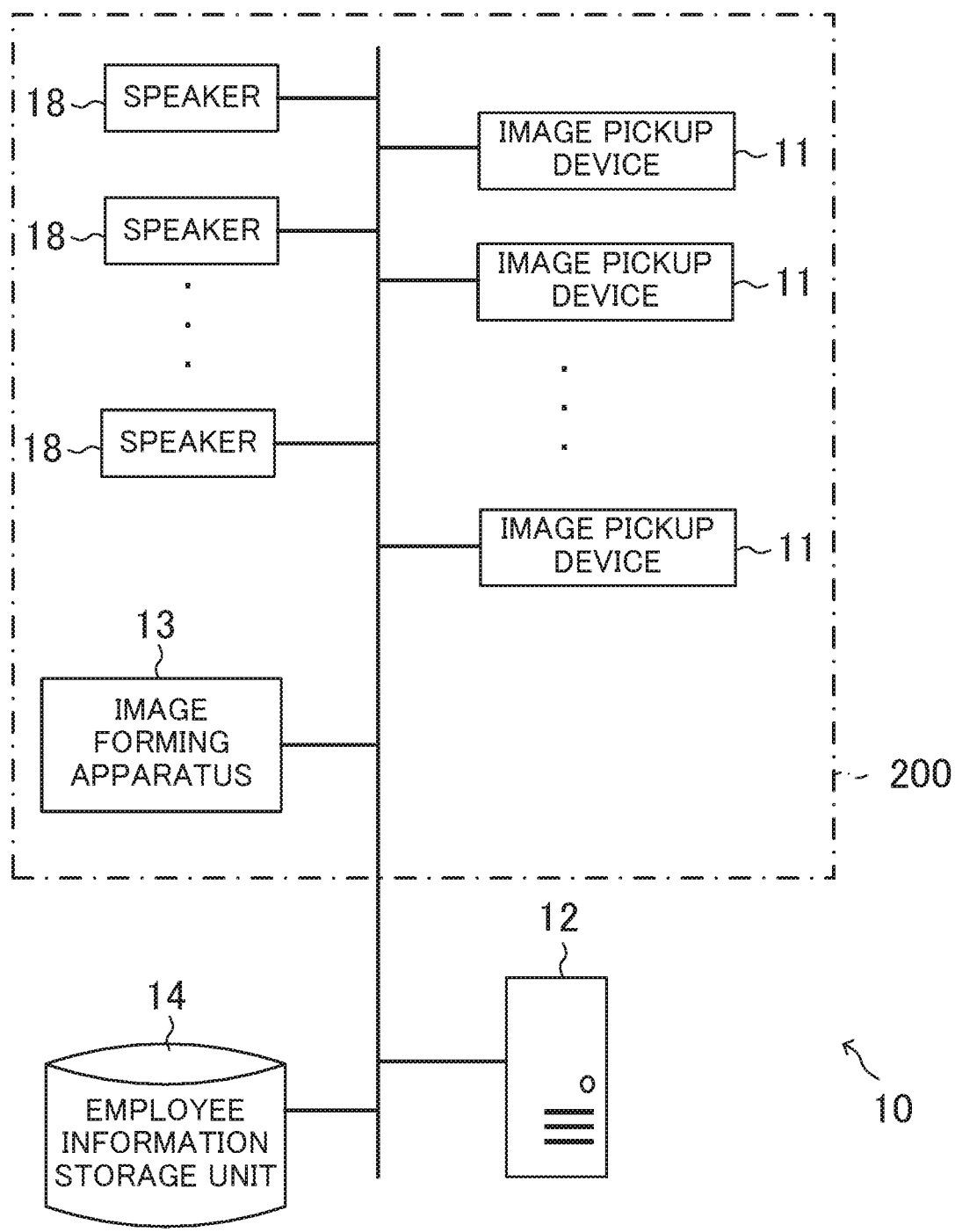
FIG. 1 is a diagram showing a schematic configuration of a management system according to one embodiment of the present disclosure.

FIG. 1 is a diagram showing a schematic configuration of a management system according to the first embodiment of the present disclosure. A management system 10 according to the first embodiment of the present disclosure includes image pickup devices 11, a server 12, an image forming apparatus 13, an employee information storage unit 14, and speakers 18.

The image pickup device 11 is for example a camera and is installed in a plurality inside a building (a company building) 200 at different places such as a room, an elevator hall, and a lobby or at a predetermined positions around the building 200 (the predetermined positions are, for example, positions within the premises of the building 200 such as a rooftop, a parking lot, and so on). Each of the image pickup devices 11 takes a still image or an animation image of a person who is present within an image pickup range. The image pickup devices 11 are connected to the server 12 and the image forming apparatus 13 so that data can be transmitted and received. The image pickup devices 11 each has a function of transmitting a captured image to the server 12 and the image forming apparatus 13.

The image forming apparatus (one example of an electronic device) 13 is installed inside the building 200. The image forming apparatus 13 is an apparatus having a single function such as a print function, a copy function, and a facsimile function or a multifunction peripheral having multiple functions including these functions. The image forming apparatus 13 is connected to each of the image pickup devices 11, the server 12, and the employee information storage unit 14 that manages employee information, so that data can be transmitted and received. The image forming method of the image forming apparatus 13 may be either an electrophotographic method or an inkjet method.

The employee information storage unit (one example of a storage unit) 14 comprises, for example, a database that stores employee information for each employee (one example of a user). The employee information storage unit 14 stores, for each of the employees, a face image showing a face of the employee, contact details, error handling capability information regarding the image forming apparatus 13, a count of handling errors occurred in the image forming apparatus 13, as the employee information (one example of user information). The employee information storage unit 14 is connected to the server 12 and the image forming apparatus 13 so that data can be transmitted and received. The error handling capability information is information indicating whether employees targeted are capable of handling each of the errors.

The speaker 18 is arranged in a plural at different places where each of the image pickup devices 11 is installed inside the building 200, for example at the room, the elevator hall, and the lobby. In other words, the speakers 18 are individually arranged in vicinity of the position where each of the image pickup devices 11 is installed. Each of the speakers 18 is connected to the image forming apparatus 13 so that data can be transmitted and received.

Figure 2:
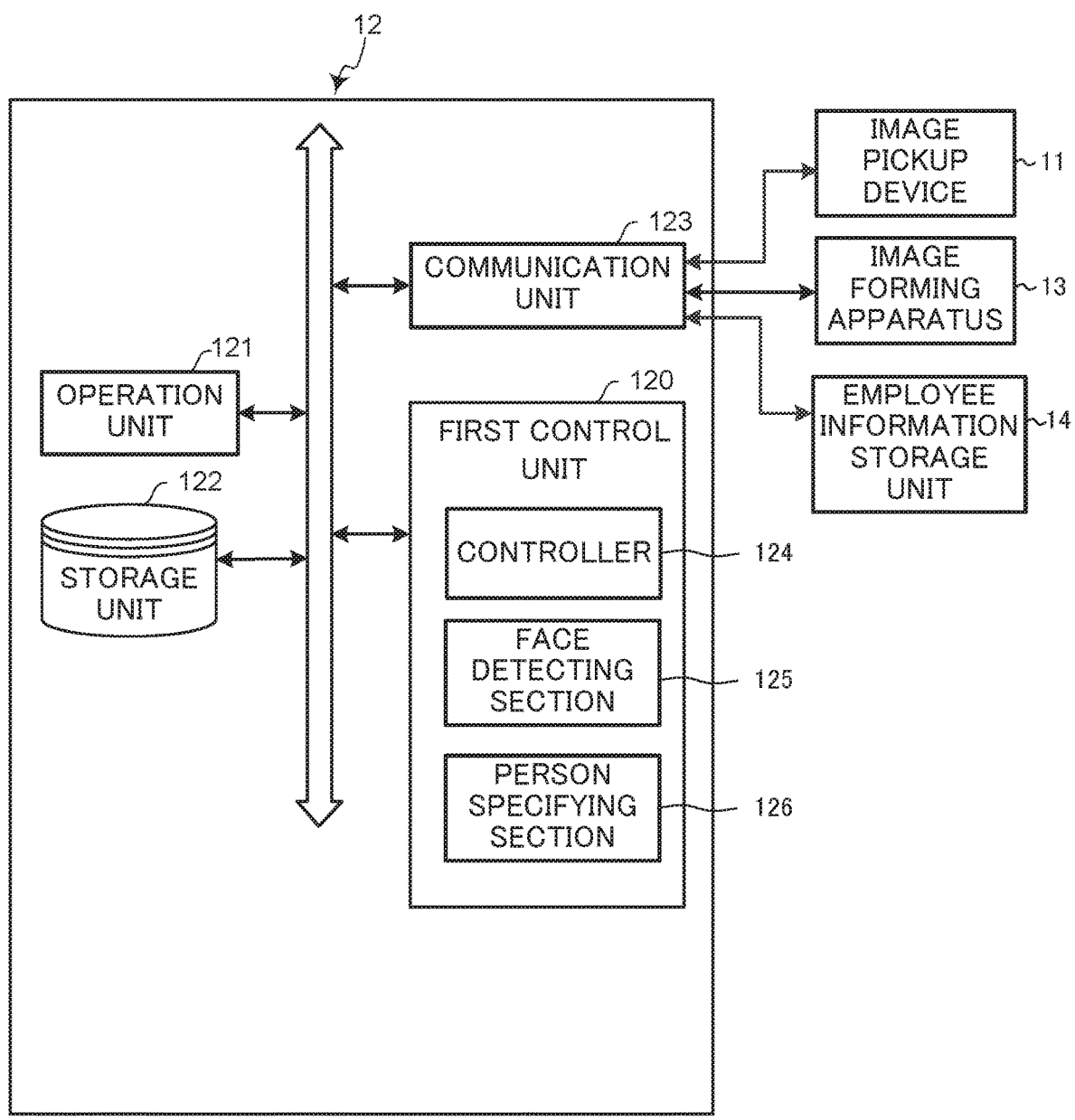
FIG. 2 is a block diagram of a main part of a server.

The server 12 will be detailed next. FIG. 2 is a block diagram of a main part of the server 12. The server 12 includes a first control unit 120, an operation unit 121, a storage unit 122, and a communication unit 123. The operation unit 121 is an input device such as a mouse and a key board. The storage unit 122 is a memory device such as an HDD (Hard Disk Drive) and a flash memory. The communication unit 123 is a communication interface that includes a LAN (Local Area Network) chip and the like. The communication unit 123 is connected, via the LAN or the network of the internet, to the image pickup device 11, the image forming apparatus 13, and the employee information storage unit 14, so that the data can be transmitted and received.

The first control unit 120 includes a processor, a RAM (Random Access Memory), a ROM (Read Only Memory), and an exclusive hardware circuit. The processor is, for example, a CPU (Central Processing Unit), an ASIC (Application Specific Integrated Circuit), or an MPU (Micro Processing Unit). The first control unit 120 functions as, upon execution of a person detecting program stored in the storage unit 122 by the processor, a controller 124, a face detecting section 125, and a person specifying section 126. The just mentioned controller 124, the face detecting section 125, and the person specifying section 126 may each be configured by a hardware circuit, instead of acting in accordance with the person detecting program by the first control unit 120. The person detecting program corresponds to the first control program.

The controller 124 governs the overall operation control of the server 12.

The face detecting section 125 analyzes the captured image captured by each of the plurality of image pickup devices 11 and detects an image portion indicating a face of a person shown in the captured image. To be specific, the face detecting section 125 extracts the image portion indicating a characteristic of a human face from the captured image obtained by the image pickup device 11, and detects that the extracted image portion is the image portion indicating the face of the person included in the captured image. Even if the captured image captured by one image pickup device 11 includes faces of a plurality of persons, the face detecting section 125 distinguishes a face of each person and individually detects the image portion indicating each of the faces. In detecting the image portion indicating the face in such the manner, the face detecting section 125 stores, for example in the RAM, information indicating which image pickup device 11 has captured the captured image including the image portion.

The person specifying section 126 collates the image portion indicating the face extracted by the face detecting section 125 to a face image of each employee having been stored in the employee information storage unit 14, and specifies, as a person who is present in the building 200, a person whose face image is identical to the image portion and is stored as the user information. On the basis of the aforementioned information stored by the face detecting section 125, the person specifying section 126 stores, for example in the RAM, information indicating which image pickup device 11 has captured the captured image including the image portion that indicates the face of specified person.

Figure 3:
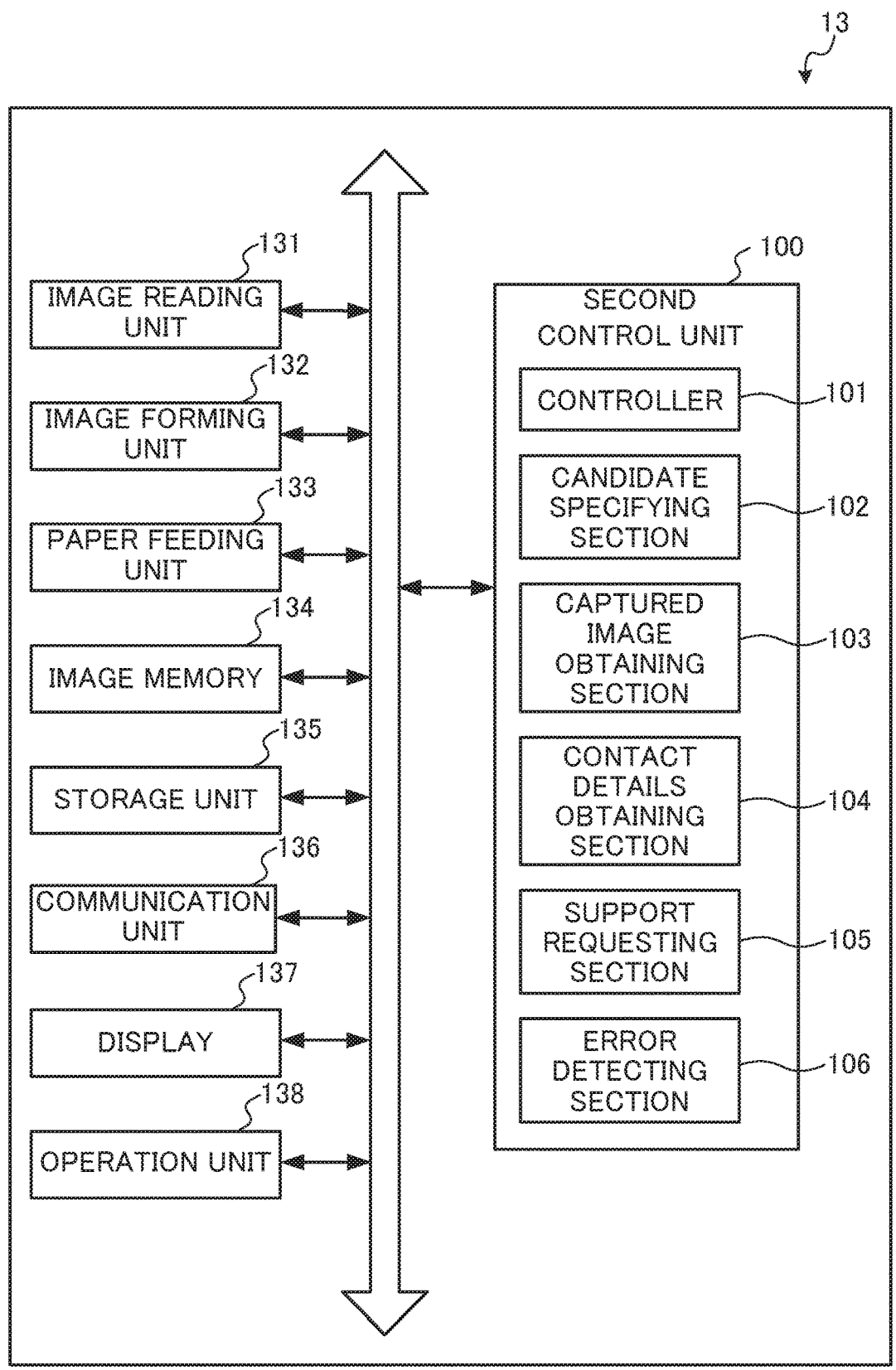
FIG. 3 is a block diagram showing an internal configuration of an image forming apparatus.

The image forming apparatus 13 is detailed. FIG. 3 is a block diagram showing an internal configuration of the image forming apparatus 13. The image forming apparatus 13 is a multifunction peripheral having a plurality of functions, such as facsimile transmission, copying, printing, and scanning. The image reading unit 131 is an ADF (auto document feeder) having a document conveying unit, and having a scanner that optically reads a document conveyed by the document conveying unit or a document placed on a contact glass. The image reading unit 131 acquires image data to be saved or to be subjected to image formation by reading the documents one by one.

The image forming unit 132, the paper feeding unit 133, the image memory 134, a storage unit 135, the communication unit 136, and so on are stored inside the image forming apparatus 13.

The image memory 134 is a region for temporarily storing the image data read by the image reading unit 131.

The image forming unit 132 reads out the image data store in the image memory 134, and by using the image data, forms (prints) an image on a sheet fed from the paper feeding unit 133. The printed sheet is discharged to the discharge tray.

The storage unit 135 is a large-capacity storage device such as the HDD.

The communication unit 136 is a communication interface including a communication module such as a LAN chip. The image forming apparatus 13 is connected to the image pickup devices 11, the server 12, and the employee information storage unit 14 via a network, and exchanges data with, for example, the image pickup devices 11, the server 12, and the employee information storage unit 14 connected via the communication unit 136.

A display 137 and an operation unit 138 are arranged at the front side of the apparatus body of the image forming apparatus 13. The display 137 is constituted of, for example, a liquid crystal display (LCD) or an organic light-emitting diode (OLED). The display 137 displays, for example, an operation screen to be used for instructing an operation of the image forming apparatus 13.

The operation unit 138, for example, includes: a start key for instructing the execution of a print job; a determination key (enter key) for performing confirmation operation on a GUI (graphical user interface) that constitutes the operation screen; and numeric value input keys through which numeric values are inputted. The operation unit 138 receives an operation on the screen displayed on the display 137 from the user.

The image forming apparatus 13 further includes a second control unit 100. The second control unit 100 includes a processor, the RAM, the ROM, and an exclusive hardware circuit. The processor is, for example, the CPU, the MPU, and the ASIC. The second control unit 100 acts, when the processor executes an operation control program stored in the ROM or the storage unit 135, as a controller 101, a candidate specifying section 102, a captured image obtaining section 103, a contact details obtaining section 104, a support requesting section 105, and an error detecting section 106. Here, the components of the second control unit 100 may each be constituted in the form of a hardware circuit, instead of being performed according to the operation control program. The operation control program corresponds to the second control program.

The controller 101 governs the overall operation control of the image forming apparatus 13. The controller 101 is connected to the image reading unit 131, the image forming unit 132, the paper feeding unit 133, the image memory 134, the storage unit 135, the communication unit 136, the display 137, the operation unit 138, and so on. The controller 101 controls operation of each of the above mechanisms to which the controller 101 is connected and performs signal or data exchange with each mechanism.

The error detecting section 106 detects an error occurring in the image forming apparatus 13. For example, based on the signals transmitted from a paper conveyance sensor, a remaining toner amount sensor, and a remaining paper amount sensor, which are provided in the image forming apparatus 13, the error detecting section 106 detects the error.

The paper conveyance sensor is a sensor for detecting a conveyance status of paper and is made of a transmission type optical sensor and so on. The paper conveyance sensor is arranged in a plurality along a paper conveyance path. When a signal indicating absence of paper is transmitted from the paper conveyance sensor when paper presence should be detected (when not receiving a signal indicating presence of paper), the error detecting section 106 detects that an error related to a paper jam has been occurred. Further, since a plurality of the paper conveyance sensors are provided along the paper conveyance path, the location of the paper jam can be identified by determining from which of the paper conveyance sensors the signal indicating the absence of the paper is transmitted.

The remaining toner amount sensor is a sensor that detects the amount of the toner remaining inside a toner container. On the basis of output of the remaining toner amount sensor, the error detecting section 106 detects that an out-of-toner error has been occurred.

The remaining paper amount sensor is a sensor that detects the presence or the absence of paper in a paper feed cassette and is, for example, a reflection type optical sensor that irradiates light toward a paper from a hole formed on a paper mounting board. The output of the remaining paper amount sensor changes depending on whether the paper is remaining and not remaining in the paper feed cassette. On the basis of the output of the remaining paper amount sensor, the error detecting section 106 detects that an error related to an out-of-paper error has been occurred.

When the error detecting section 106 detects an error, the candidate specifying section 102 refers to the employee information stored in the employee information storage unit 14 and specifies as a support candidate, among the persons having been specified by the person specifying section 126, a person whom the error handling capability information indicated as capable of handling the error.

Which person is capable of handing the error is determined by the user considering a department (such as a system department) and a job title (such as a system engineer), to which the person belongs, and the result thereof is registered, as the error handling capability information, in the employee information storage unit.

If the error detecting section 106 is capable of detecting as far as an error type, the error handling capability information stored in the employee information storage unit 14 indicates, for each error type, whether the person who is targeted is the person capable of handling the error. The candidate specifying section 102 refers to the employee information stored in the employee information storage unit 14 and specifies as the support candidate, among the persons having been specified by the person specifying section 126, the person whom the error handling capability information has indicated as being capable of handling the error of the type detected by the error detecting section 106.

The captured image obtaining section 103 obtains, among the plurality of captured images captured by the image pickup devices 11, the captured image in which the support candidate having been specified by the candidate specifying section 102 is shown. The person specifying section 126 specifies each person present inside the building 200, and because the information indicating which image pickup device 11 has captured the captured image including the face of the specified person is also being stored, on the basis of the information, the captured image obtaining section 103 selects and obtains the captured image including the face of the support candidate from each of the captured images captured by the plurality of image pickup devices 11. Here, when there are several support candidates, the captured image obtaining section 103 obtains each of the captured images containing the face of each support candidate. The captured image obtaining section 103 obtains information indicating which location that the image pickup device 11 having been captured the obtained captured image has been installed at, and stores the information, for example in the RAM.

The contact details obtaining section 104 refers to the employee information stored in the employee information storage unit 14 and obtains contact details for the support candidate. The contact details are, for example, a mail address, an IP address, and the like.

Figure 5:
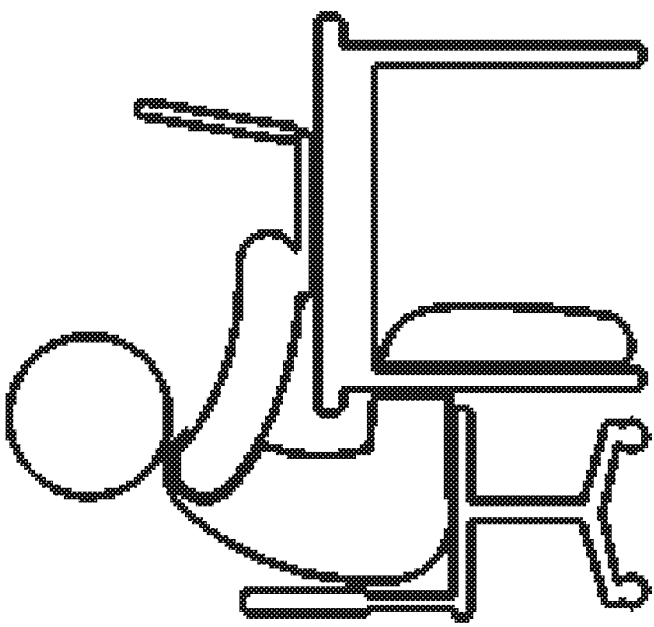
FIG. 5 is a diagram showing an example of a display screen displayed at a display.

As an example is illustrated in FIG. 5, the controller 101 allows the display 137 to display the captured image captured by the captured image obtaining section 103 and the contact details obtained by the contact details obtaining section 104. Here, the controller 101 obtains from the captured image obtaining section 103 information indicating at which location the image pickup device 11 that has obtained the captured image to be displayed is installed, and allows the display 137 to display the installation location together with the captured image.

With this configuration, upon occurrence of an error in the image forming apparatus 13, the screen of the display 137 is switched to the captured image by the image pickup devices 11, and the image of the person who is capable of handling the error and the person's contact details are displayed thereon. The user of the image forming apparatus 13 can view the screen and make a request for error handling to the person shown there and to the person's contact details.

Furthermore, when there are several support candidates, the controller 101 allows the screen of the display 137 to be divided, for example in the manner illustrated in FIG. 6, and allows the display 137 to simultaneously display the captured images on which each of the support candidates is respectively shown and each contact details. Thus, the user of the image forming apparatus 13 can view the screen of the display 137 and after checking what the support candidate is doing, the present location, and the upcoming schedule (the user judges oneself) of each support candidate, select the most appropriate support candidate from the plurality of support candidates.

Alternatively, the employee information storage unit 14 may store, as one kind of the employee information, the number of times that each person has handled errors occurred in the image forming apparatus 13. When there are several support candidates, the controller 101 refers to the employee information stored in the employee information storage unit 14 and obtains the number of times that each support candidate ever handled the errors. Then the controller 101 allows the screen of the display 137 to be divided, arranges each of the support candidates in, for example decreasing order of the obtained number of error-handling-times from the top, and allows the display 137 to display, together with each captured image including the support candidate, the contact details obtained by the contact details obtaining section 104. With this arrangement, the user of the image forming apparatus 13 can view the display 137 and select the person whose number of error handling times is large and is suitable to handle the error.

The support requesting section 105 performs notification processing to notify of error handling request to the contact details of the support candidate. For example, when the user performs touch operation touching the display screen of the display 137 while the captured image captured by the captured image obtaining section 103, that is, the captured image including the face of the support candidate, is being displayed, the touch panel of the display 137 receives the operation, and the touch panel transmits an error handling request instruction to the second control unit 100. In accordance with the error handling request instruction, the support requesting section 105 transmits, through the communication unit 136, an e-mail including a message requesting to handle the error to the contact details (such as an e-mail address) of the person (employee) being displayed on the captured image. With the configuration, it is possible to transmit the message requesting to handle the error to a personal computer (terminal) or a portable terminal device such as a smartphone of the person (employee) who is capable of handling the error.

Alternatively, if an IP address is shown as the contact details, the support requesting section 105 may be arranged to transmit, through the communication unit 136, the message requesting to handle the error to a personal computer that is represented by the IP address and is connected to the image forming apparatus 13 via the network.

When the support requesting section 105 performs the notification processing in such the manner, the controller 101 may be arranged to allow the display 137 not to display the contact details obtained by the contact details obtaining section 104. In this case, the support requesting section 105 obtains the contact details and performs the notification processing, so that it is unnecessary to inform the user of the contact details.

Alternatively, as the notification processing, the support requesting section 105 may allow the speaker 18, which is installed at the location where the image pickup device 11 having been captured the captured image including the face of the support candidate is installed, to emit the message requesting to handle the error.

The support requesting section 105 may be arranged to add details of the error (such as a paper jam, an out-of-toner error, or an out-of-paper error) to the message, and transmit, through the communication unit 136, an e-mail to the contact details (such as the e-mail address). Alternatively, the support requesting section 105 may be arranged to transmit the message requesting to handle the error to the personal computer represented by the IP address. Thus, if the error is the out-of-toner error, for example, the support candidate who is requested to handle the error can grasp that a toner replenishment operation is the processing to eliminate the error.

Figure 4:
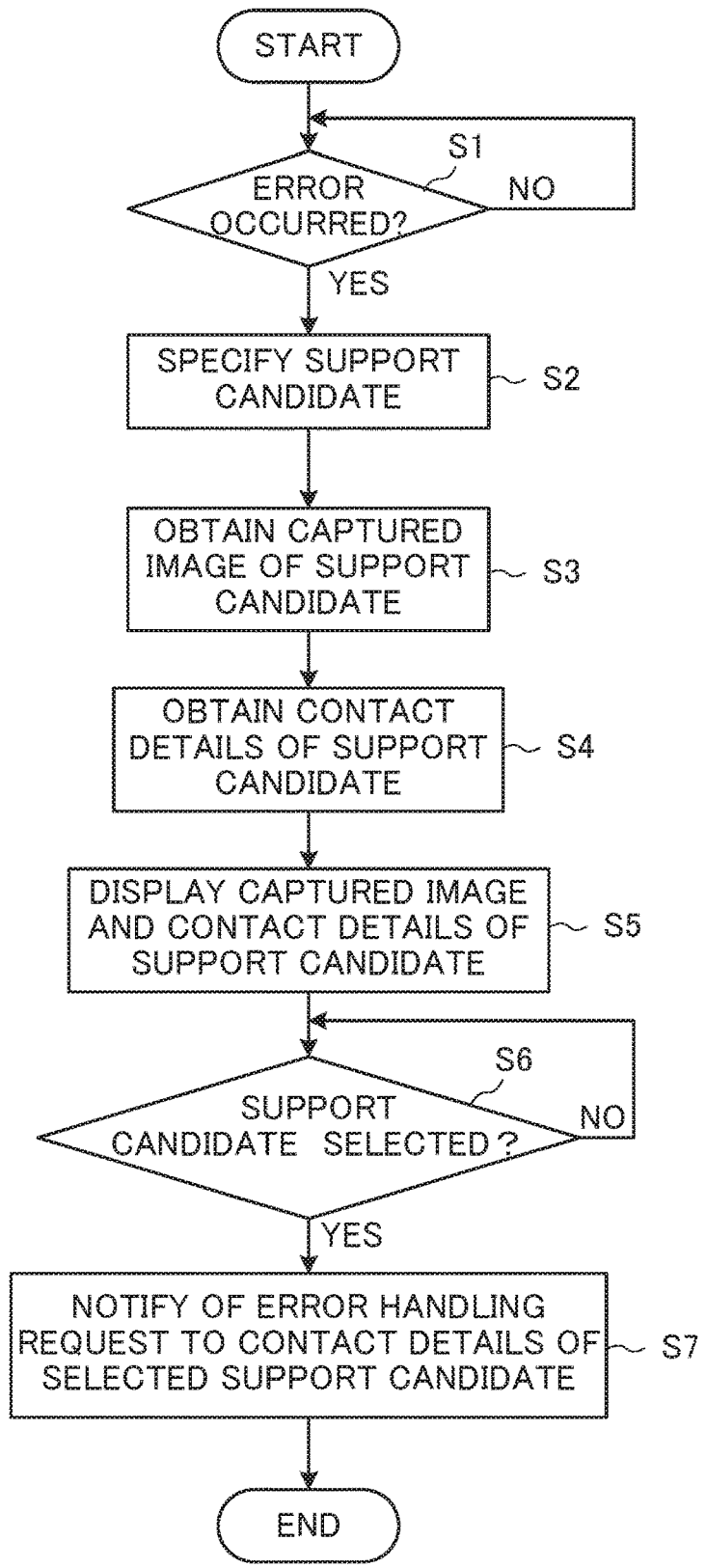
FIG. 4 is a flowchart showing support requesting processing when an error occurred in the image forming apparatus.

Next, operation of the management system 10 will be described. FIG. 4 is a flowchart showing support requesting processing when an error occurred in the image forming apparatus 13.

When the error detecting section 106 detects an error in the image forming apparatus 13 (YES in step S1), the candidate specifying section 102 refers to the employee information stored in the employee information storage unit 14 and specifies as the support candidate, among the persons having been specified by the person specifying section 126, the person whom the error handling capability information has indicated as being capable of handling the error (step S2).

The employee information storage unit 14 may store, as a part of the employee information, a superior of the person and contact details of the superior, or an administrator and contact details of the administrator in advance. When there is no person indicated as the person capable of handling the error by the error handling capability information even after the candidate specifying section 102 refers to the employee information stored in the employee information storage unit 14, the superior or the administrator may be specified as the support candidate.

When the support candidate is specified, the captured image obtaining section 103 obtains, among each of the captured images captured by the plurality of image pickup devices 11, the captured image in which the support candidate is shown (step S3). Also, the contact details obtaining section 104 refers to the employee information stored in the employee information storage unit 14 and obtains the contact details of the support candidate (step S4).

Upon obtaining the captured image in which the support candidate is shown and the contact details of the support candidate, the controller 101 allows the display 137 to display, together with the captured image captured by the captured image obtaining section 103, the contact details obtained by the contact details obtaining section 104 (step S5). The user of the image forming apparatus 13 can view the image displayed on the display 137 and selects the appropriate support candidate who is capable handling the error. Here, in step S5, from the standpoint of security improvement, the controller 101 may allow the display 137 to display the captured image obtained by the captured image obtaining section 103 and the contact details obtained by the contact details obtaining section 104, or at least the captured image obtained by the captured image obtaining section 103, for only a predetermined time period (for example 5 seconds). The controller 101 for example sets the predetermined time period in accordance with a time designated by the operation of the operation unit 138 by the administrator.

When the user of the image forming apparatus 13 touches the display screen of the display 137 on which the appropriate support candidate is displayed in the manner described above to select the most appropriate person among the support candidates displayed on the display 137 (YES in step S6), the support requesting section 105 performs the processing to notify of the error handling request to the contact details of the selected support candidate (step S7).

When an error occurs in a general image forming apparatus, a user who is set to be capable of working on an error handling work can be notified of the occurrence of the error at an error notification time. The user is capable of promptly and surely eliminating the error occurred in the image forming apparatus in such the image forming apparatus. However, if the user who is set to be capable of working on the error handling work is at far from the image forming apparatus, there is a risk that it will take long time before the error is eliminated.

As described thus far, according to the first embodiment, when an error occurs in the image forming apparatus 13, the user can quickly find the person who is capable handling the error. Furthermore, the user can notify of the error handling request to the person with the simple operation. This makes it possible to shorten the downtime of the image forming apparatus 13 caused by the error occurrence.

The present disclosure is not limited to the configurations of the first embodiment and can be modified in various ways. For example, though in the first embodiment the employee information storage unit 14 is the database, the face detecting section 125 and the person specifying section 126 are provided at a side of the server 12, these employee information storage unit 14, face detecting section 125, and person specifying section 126 may be provided at the image forming apparatus 13.

Figure 7:
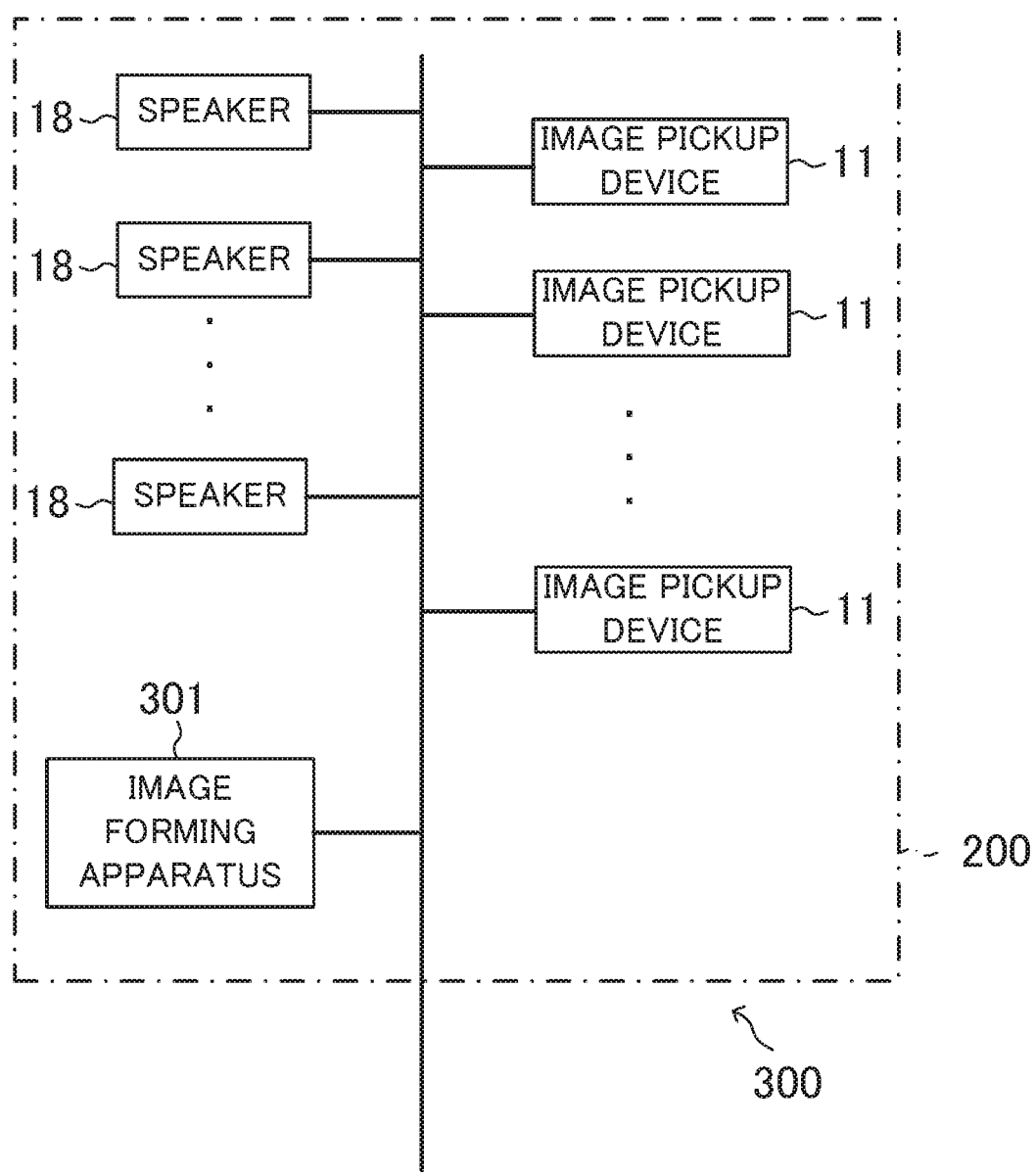
FIG. 7 is a diagram of a schematic configuration showing another example of the management system.
Figure 8:
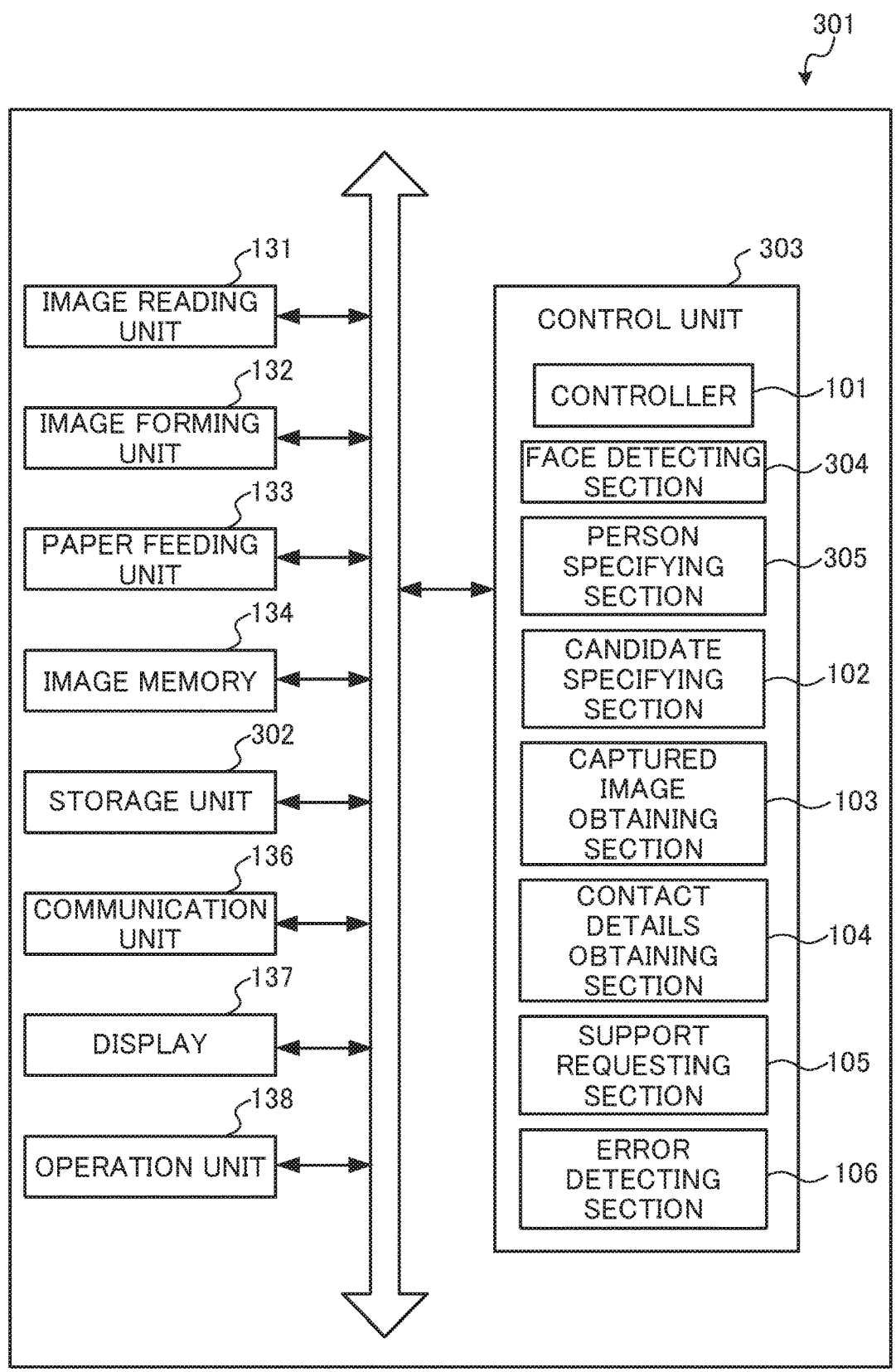
FIG. 8 is a block diagram showing another example of the internal configuration of the image forming apparatus.

In that case, as illustrated in FIG. 7, the management system 300 includes the image pickup devices 11, the image forming apparatus 301, and the speakers 18. As illustrated in FIG. 8, a storage unit 302 is included in the image forming apparatus 301 in place of the storage unit 135 of the first embodiment. The storage unit 302 is configured in the same manner with the storage unit 135, except for storing the employee information. The image forming apparatus 301 includes a control unit 303 in place of the second control unit 100 of the first embodiment. The control unit 303 functions, upon execution of the person detecting program and the operation control program stored in the ROM or the storage unit 302 by the processor, as: the controller 101; a face detecting section 304; a person specifying section 305; the candidate specifying section 102; the captured image obtaining section 103; the contact details obtaining section 104; the support requesting section 105; and the error detecting section 106. The face detecting section 304 and the person specifying section 305 function in the same ways with the face detecting section 125 and the person specifying section 126 of the first embodiment. The control unit 303 is configured in the same manner with the second control unit 100 except for functioning as the face detecting section 304 and the person specifying section 305.

Furthermore, in the first embodiment, the contact details obtaining section 104 obtains the contact details and the controller 101 allows the display 137 to display the contact details, or the support requesting section 105 performs the processing to notify of the error handling request to the contact details. In another embodiment, the contact details obtaining section 104 may not be provided and the controller 101 may allow the display 137 to display only the captured image obtained by the captured image obtaining section 103. In such the embodiment, the user can view the person being displayed at the display 137, and the user can make contact with the person on his/her own by knowing the identity and the job title of the person, and also the location of the person from the displayed image.

Further, the configurations and processes of the embodiment described with reference to FIGS. 1 to 8 are merely exemplary, and not intended to limit the configurations and processes of the embodiment of the disclosure. For example, in the above embodiments, the image forming apparatus was referred to as one example of the electronic device in the scope of claims, but the electronic device may be other than the image forming apparatus: it may be a medical equipment, a machine tools, and the like, any electric devices other than the image forming apparatus.

While the present disclosure has been described in detail with reference to the embodiments thereof, it would be apparent to those skilled in the art the various changes and modifications may be made therein within the scope defined by the appended claims.

What is claimed is:

1. A management system comprising:
an electronic device installed inside a building;
a plurality of image pickup devices installed inside the building or at predetermined positions around the building;
a storage unit that stores user information for each of a plurality of users, the user information including a face image showing a face of each person, contact details, and error handling capability information indicating whether the user is a person capable of handling an error of the electronic device; and a server that includes a first control unit, the first control unit containing a processor and, upon execution of a first control program by the processor, functioning as:
a face detecting section that analyzes a captured image captured by each of the plurality of image pickup devices and detects an image portion indicating a face of a person shown in the captured image; and
a person specifying section that collates the image portion detected by the face detecting section to the face image stored in the storage unit, and specifies, as a person who is present in the building, a person whose face image is identical to the image portion and is stored as the user information, wherein
the electronic device including:
a display; and
a second control unit containing a processor and, upon execution of a second control program by the processor, functioning as:
an error detecting section that detects an error occurred in the electronic device;
a candidate specifying section that refers to the user information stored in the storage unit when the error detecting section detects the error, and specifies as a support candidate, among persons that the person specifying section has specified, a person who is indicated by the error handling capability information as being capable of handling the error;
a captured image obtaining section that obtains, among captured images captured by the plurality of image pickup devices, a captured image in which the support candidate specified by the candidate specifying section is shown; and
a controller that allows the display to display the captured image captured by the captured image obtaining section.

2. The management system according to claim 1, wherein the second control unit further functions as a contact details obtaining section that refers to the user information stored in the storage unit and obtains the contact details of the support candidate, and
the controller allows the display to display, together with the captured image captured by the captured image obtaining section, the contact details obtained by the contact details obtaining section.

3. The management system according to claim 1, wherein the second control unit further functions as:
a contact details obtaining section that refers to the user information stored in the storage unit and obtains the contact details of the support candidate; and
a support requesting section that performs notification processing to notify of error handling request to the contact details of the support candidate obtained by the contact details obtaining section.

4. The management system according to claim 3, wherein the support requesting section performs the notification processing to notify of the error handling request including details of the error to the contact details of the support candidate.

5. The management system according to claim 3, further comprising a plurality of speakers arranged near the positions where the image pickup devices are installed, wherein
the captured image obtaining section further obtains information indicating an installation position of one of the image pickup devices that has captured the captured image showing the support candidate, and
the support requesting section allows the speakers arranged near the installation position of the one image pickup device that has captured the captured image showing the support candidate to output, as the notification processing, a message requesting to handle the error.

6. The management system according to claim 1, wherein when there is a plurality of support candidates, the controller divides a screen of the display and allows the display to simultaneously display each captured image any of the plurality of support candidates is shown.

7. The management system according to claim 6, wherein the storage section further stores, as the user information, a count of handling representing a number of times that each person has handled errors occurred in the electronic device, and
when the number of the support candidate is plural, the controller refers to the user information stored in the storage unit, obtains the count of handling for each of the support candidates, and allows the display to display the captured images obtained by the captured image obtaining section in decreasing order of the count of handling.

8. The management system according to claim 1, wherein the electronic device is an image forming apparatus, the image forming apparatus further comprising an image forming unit that forms an image on a recording medium.

9. The management system according to claim 1, wherein the error handling capability information indicates, for each error type, whether the person targeted is capable of handling the error, and
when the error detecting section detects, together with the error, types of the error, the candidate specifying section refers to the user information stored in the storage unit and specifies as the support candidate, among the persons having been specified by the person specifying section, the person whom the error handling capability information has indicated as being capable of handling the error of the type detected by the error detecting section.

10. A management system comprising;
an electronic device installed inside a building; and
a plurality of image pickup devices installed inside the building or at predetermined positions around the building,
wherein the electronic device comprises:
a display;
a storage unit that stores user information for each of a plurality of users, the user information including a face image showing a face of each person, contact details, and error handling capability information indicating whether the user is a person capable of handling an error of the electronic device; and
a control unit that contains a processor and, upon execution of a first control program and a second control program by the processor, functions as:
a face detecting section that analyzes a captured image captured by each of the plurality of image pickup devices and detects an image portion indicating a face of a person shown in the captured image;
a person specifying section that collates the image portion detected by the face detecting section to the face image stored in the storage unit, and specifies, as a person who is present in the building, a person whose face image is identical to the image portion and is stored as the user information;
an error detecting section that detects an error occurred in the electronic device;

a candidate specifying section that refers to the user information stored in the storage unit when the error detecting section detects the error, and specifies as a support candidate, among persons that the person specifying section has specified, a person who is indicated by the error handling capability information as being capable of handling the error;

a captured image obtaining section that obtains, among captured images captured by the plurality of image pickup devices, a captured image in which the support candidate specified by the candidate specifying section is shown; and a controller that allows the display to display the captured image captured by the captured image obtaining section.

* * * * *